United States Patent [19]

Waniczek et al.

[11] Patent Number: 4,506,045
[45] Date of Patent: Mar. 19, 1985

[54] CELLULOSE ESTER-ALIPHATIC POLYCARBONATE THERMOPLASTIC MOULDING COMPOSITIONS

[75] Inventors: Helmut Waniczek; Christian Lindner, both of Cologne; Carlhans Süling; Herbert Bartl, both of Odenthal; Walter Uerdingen, Leverkusen, all of Fed. Rep. of Germany

[73] Assignee: Bayer Aktiengesellschaft, Leverkusen, Fed. Rep. of Germany

[21] Appl. No.: 532,238

[22] Filed: Sep. 14, 1983

[30] Foreign Application Priority Data

Oct. 2, 1982 [DE] Fed. Rep. of Germany ....... 3236521
Apr. 19, 1983 [DE] Fed. Rep. of Germany ....... 3314188

[51] Int. Cl.³ .......................... C08L 1/10; G02B 1/04
[52] U.S. Cl. ......................................... 524/31; 524/37; 524/38; 524/39; 524/40; 524/41; 525/932; 528/370; 264/331.18
[58] Field of Search ...................... 524/31, 32, 37, 38, 524/39, 40, 41; 264/331.11, 331.18; 525/932; 528/370

[56] References Cited

U.S. PATENT DOCUMENTS 3,431,224 3/1969 Goldblum ............................ 524/37
4,192,940 3/1980 Lindner et al. ..................... 528/370
4,216,298 8/1980 Schreckenberg et al. .......... 525/439

OTHER PUBLICATIONS

Polymer Blends, D. R. Paul a. S. Newman, Academic Press, New York, 1978, vol. 1, pp. 55–61.

Primary Examiner—John Kight
Assistant Examiner—Nathan M. Nutter
Attorney, Agent, or Firm—Sprung Horn Kramer & Woods

[57] ABSTRACT

Thermoplastic moulding compositions consisting of from 1 to 99% by weight of at least one cellulose ester or cellulose mixed ester, from 99 to 1% by weight of an aliphatic polyester or polyether containing carbonate groups and, optionally, standard auxiliaries and additives.

7 Claims, No Drawings

CELLULOSE ESTER-ALIPHATIC POLYCARBONATE THERMOPLASTIC MOULDING COMPOSITIONS

This invention relates to thermoplastic moulding compositions of cellulose esters or cellulose mixed esters and aliphatic polyesters or polyethers containing carbonate groups as links in the polymer chain.

The moulding compositions according to the invention are distinguished by their excellent compatibility over wide mixing ranges and, hence, transparency which they retain, even on storage. In addition, moulding compositions consisting predominantly of cellulose esters show not only excellent transparency, but also unexpected impact strength particularly at low temperatures, which is necessary for many applications.

Accordingly, the present invention relates to thermoplastic moulding compositions consisting of I. from 1 to 99% by weight based on the amount of component I and II of at least one cellulose ester or cellulose mixed ester, II. from 99 to 1% by weight based on at least one aliphatic polyester or polyether containing carbonate groups in the polymer chain as linkage and having a molecular weight of from 2,000 to 300,000, preferably 4,000–200,000 and III. optionally, standard auxiliaries and additives.

Of the mixtures according to the invention mixtures consisting of from 80 to 97% by weight and preferably from 85 to 95% by weight of component (I) and from 3 to 20% by weight and preferably from 5 to 15% by weight of component (II) are distinguished by outstanding impact strength.

Other preferred mixtures are mixtures of from 1 to 50% by weight, preferably from 10 to 35% by weight of component (I) and from 99 to 50% by weight, preferably from 90 to 65% by weight of component (II), because these mixtures are distinguished by their transparency, even in the event of prolonged storage.

The cellulose esters used in accordance with the invention may be the known esters of cellulose, such as for example the esters with acetic acid, propionic acid or butyric acid, or mixed esters of cellulose with acetic acid, propionic acid or butyric acid. Their hydroxyl group content should be in the range from 0.3 to 3% by weight and their melting viscosity in the range from 30 to 18,000 mPa.s at 23° C. (20% in acetone/ethanol 9:1).

Cellulose esters of carboxylic acids with $C_1$–$C_4$ having a hydroxyl group content of from 0.4 to 2% by weight and a viscosity of from 500 to 10,000 mPa.s (at 23° C., 20% in acetone/ethanol 9:1) are preferably used in accordance with the invention, mixed esters of cellulose having an acetyl group content of from 10 to 32% by weight, a butyryl group content of from 15 to 40% by weight, a hydroxyl group content of from 0.5 to 1% by weight and a viscosity of from 5000 to 10,000 mPa.s (at 23° C. in acetone/ethanol 9:1) being particularly preferred.

Cellulose esters of the type in question are known and are described, for example, in Kunststoff-Handbuch Vol. III, Abgewandelte Naturstoffe, (Modified Naturally Occurring Substances), Carl Hanser Verlag, Munich, 1965, pages 201 to 349. They are produced by esterifying cellulose in solution in acetic acid or methylene chloride with acetic acid anhydride, propionic acid anhydride or butyric acid anhydride, with mixtures thereof or with mixed carboxylic acid anhydrides.

The relative viscosity $\eta$ rel of the cellulose esters used measured on a 2% solution in acetone at 25° C. is preferably between 3.5–5,0, more preferably from 4.0 to 4.5.

The cellulose esters used in accordance with the invention may of course contain standard additives, such as plasticizers, such as for example esters of phthalic acid, such as dimethyl phthalate or dibutyl phthalate, camphor or ethyl derivatives of benzene and toluene sulfonamides, also flameproofing agents, such as for example triphenyl phosphate or trichloroethyl phosphate, or dyes.

The second polymer component of the inventive moulding compositions is preferably an aliphatic polyester and/or polyether carbonate having the following recurring structural unit I and an average molecular weight Mn of from to 2,000 to 300,000:

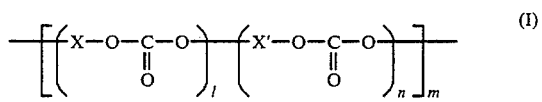

in which X' means the same or different residue of an aliphatic polyester having a molecular weight of from 200 to 6,000, preferably from 1,000 to 2,500, X=X" or means the same or different residue of an aliphatic polyether having a molecular weight of from 200 to 20,000, preferably 700 to 10000, most preferably from 200 to 1000, l is an integer of from 1 to 20, n=0 or an integer of from 1 to 20, m is an integer of $\geq 20$, and the compounds have an intrinsic viscosity in tetrahydrofuran $\eta$ from 0.5 to 2.5 dl/6, preferably from 0.8 to 1.5 dl/g.

Polyethers in which X is the residue of an aliphatic polyether having a molecular weight of from 200 to 3500 and n and l is an integer of from 10 to 20 are particularly suitable for the production of transparent moulding compositions showing stability in storage.

Suitable polyhydric alcohols for the polyester of which the residue X' may be derived are, for example, ethylene glycol, 1,2- and 1,3-propylene glycol, 1,4-and 2,3-butylene glycol, 1,6-hexane diol, 1,8-octane diol, neopentyl glycol, cyclohexane dimethanol, 1,4-(bis-(hydroxymethylcyclohexane), 2-methyl-1,3-propane diol, di-, tri-, tetra- and polyethylene glycol, di-, tri-, tetra- and polypropylene glycol and dibutylene glycol, optionally in admixture with one another. Suitable polybasic aliphatic carboxylic acids for the polyesters of which the residue X' may be derived are preferably dibasic aliphatic carboxylic acids such as, for example, carbonic acid, oxalic acid, malonic acid, succinic acid, adipic acid, suberic acid, azelaic acid, sebacic acid, hexahydrophthalic acid, glutaric acid or mixtures thereof. Instead of using the free carboxylic acids, it is also possible to use their anhydrides or their esters with low alcohols.

Suitable lactones for the polyesters of which the residue X' may be derived are, for example γ-butyrolactone, θ-valerolactone, ε-caprolactone, 7-hydroxyhexanoic acid lactone or 8-hydroxyoctanoic acid lactone.

Suitable hydroxycarboxylic acids for the polyesters of which the residue X' may be claimed, for example, β-hydroxypropionic acid, γ-hydroxybutyric acid, θ-hydroxyvaleric acid, ε-hydroxycaproic acid, 7-hydroxyhexanoic acid or 2-hydroxymethylbenzoic acid or 4-hydroxycyclohexane carboxylic acid.

As polyether residue X preferably compounds of the following general formula II can be used;

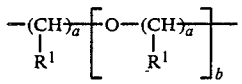

in which the radicals
R' the same or different represent H or $C_1$–$C_4$-alkyl radicals, preferably H or $CH_3$
a is an integer of from 2 to 10, preferably 2 or 4 and
b is an integer of from 2 to 350, more particularly from 2 to 250.

Examples of compounds such as these are poly-(ethyleneoxide)-glycols, poly(1,2-propylene-oxide)-glycols, poly(1,3-propylene-oxide)-glycols, poly-(1,2-butylene-oxide)-glycols, poly-(tetrahydrofuran)-glycols, the corresponding poly-(pentylene-oxide)-glycols, poly(hhexamethylene-oxide)glycols, poly-(heptamethylene-oxide)-glycols, poly-(octamethyleneoxide)-glycols, poly-(monomethylene-oxide)-glycols and the copolymers or block copolymers of, for example, ethylene oxide and propylene oxide.

The polyesters and polyethers containing carbonate groups in the polymer chain may be produced by reacting the described hydroxyl-terminated polyesters and polyethers with carbonic-acid-bis-aryl esters corresponding to the following formula

in which Ar is a substituted or unsubstituted $C_6$–$C_{18}$-aryl radical, suitable substituents being, in particular, $C_1$–$C_4$-alkyls and also nitro groups or halogen atoms, or with bis-aryl carbonates corresponding to the following formula

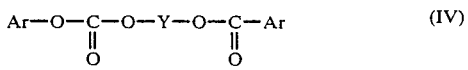

in which Y has the same meaning as X and X' in formula (I) or represents a polyester or a polyether of the recurring structural unit of formula I which contains carbonate groups in the polymer chain.

The reaction is normally carried out at temperatures in the range from 110° to 200° C. in the presence of transesterification catalysts, such as for example alkali metal or alkaline-earth metal phenolates, alkali or alkaline-earth metal alcoholates, tertiary amines, such as for example triethylene diamine, morpholine, pyrrolidone, pyridine, triethylamine, or metal compounds, such as antimony trioxide, zinc chloride, titanium tetrachloride and titanic acid tetrabutylester, the catalyst being used in quantities of from 20 ppm to 200 ppm, based on the total weight of the reaction components.

Reaction products such as these are known and are described, for example, in DOS No. 27 32 718 or in DOS No. 27 12 435 and in DOS No. 26 51 639.

The intrinsic viscosity $\eta$ is measured in tetrahydrofuran at 25° C. and is expressed in dl/g (for the definition of intrinsic viscosity, see H. G. Elias "Makromolekule" Huthig & Wepf-Verlag, Basle, page 265).

The polymer blends according to the invention may be obtained by blending the cellulose esters or cellulose mixed esters with the polyesters or polyethers containing carbonate groups, optionally in the presence of stabilizers, plasticizers, lubricants, pigments, dyes, solvents or optical brighteners. The mixture may then be homogenized on mixing rolls at temperatures of up to 200° C., removed in the form of a rough sheet and sizereduced for further processing. Mixing may also be carried out in kneaders and the product according to the invention may be discharged in the shape of a strand or in any other shape.

In one particular embodiment of the invention, the components of the mixture are homogenized in single-screw or multiple-screw mixing extruders, followed by granulation. In this case, it is important to ensure that the extruder shafts are designed in such a way that thorough mechanical intermixing is obtained. Another result of the strong plasticizing effect of the polyesters containing carbonate groups is that the molding compositions according to the invention can be produced at relatively low temperatures (140° to 180° C.), in which case products with little coloration are obtained. The molding compositions may of course also be produced at higher temperatures (180° to 250° C). It is also possible in this way directly to produce finished articles, such as films, strands or injection moldings.

The modified cellulose esters according to the invention may also be produced by dissolving the components of the mixture in suitable solvents or solvent mixtures and subsequently evaporating the solvents. The solvent may be evaporated either by casting a film and evaporating off the volatile solvents at normal pressure or in vacuo at temperatures in the range from 0° to 220° C. or by concentration through evaporation using degassing extruders.

Examples of suitable solvents are ketones, such as acetone, methyl ethyl ketone, cyclohexanone or diethyl ketone, esters such as acetic acid methyl ester, acetic acid ethyl ester or butyl ester or formic acid methyl ester, ethers, such as diethyl ether, methyl, ethyl, propyl or butyl ethers of ethylene glycol or diethylene glycol or tetrahydrofuran, amides, such as dimethyl formamide or diethyl formamide, chlorinated hydrocarbons, such as dichloromethane, trichloromethane, tetrachloromethane, dichloroethane or dichloroethylene, or substituted or unsubstituted aromatic solvents, such as benzene, toluene, xylene, chlorobenzene, dichlorobenzene, nitrobenzene, anisole, phenol or cresol.

The molding compositions according to the invention may be processed by any of the methods normally used for processing plastics, for example by injection molding, extrusion or blow forming.

One particular advantage of the molding compositions according to the invention is their complete transparency and the excellent miscibility of the components.

The molding compositions according to the invention may be used for the production of utility articles, such as injection moldings for domestic and industrial use, for seals, films or other shaped articles or optical articles, particularly laminated glass.

EXAMPLES

Production of the polyesters and polyethers containing carbonate groups in the polymer chain:

(A) 1000 parts by weight of a linear polyether of ethylene glycol units having an average molecular weight of 608 (as determined by measuring the OH number), 334.8 parts by weight of diphenyl carbonate and 0.1 part by weight of sodium phenolate are stirred for 1 hour at temperatures in the range from 160° to 190° C. The volatile polycondensation products formed, above all phenol, are then distilled off in a vacuum of 1.5 Torr. While distillation continues, the temperature is increased to 190° C. for 4 hours. A viscoelastic mass is obtained which has an intrinsic viscosity $\eta$ of 0.238, as measured in tetrahydrofuran (THF) at 25° C., and a molecular weight ~5000 g/mole (as determined by vapor pressure osmosis).

(B) 1000 parts by weight of a linear polyethylene glycol having an average molecular weight of 608 and an OH number of 184, 358 parts by weight of diphenyl carbonate, 0.1 part by weight of sodium phenolate and 1.2 parts by weight of dilauryl dithiopropionate (Irganox ®PS 800) are treated in the same way as in Example (A). A rubber-like, visco-elastic mass having an intrinsic viscosity $\eta$ of 0.642 (as measured in tetrahydrofuran (THF) at 25° C.) is obtained.

(C) 300 parts by weight of a polyester diol of adipic acid and a mixture of n-hexane-1,6-diol/neopentyl glycol in a ratio of 65:35 (average molecular weight Mn 2000, as determined by measuring the OH number), 700 parts by weight of a linear polyether having an average molecular weight Mn of 608 (as determined by measuring the OH number), 286.4 parts by weight of diphenyl carbonate, 0.1 part by weight of sodium phenolate and 1.2 parts by weight of Irganox ®PS 800 are stirred for 1 hour at 185° C., after which the volatile condensation products, above all phenol, are distilled off with stirring over a period of 5 hours under a vacuum of 1.5 Torr and at a temperature of 185° C. The product is a highly elastic rubber having an intrinsic viscosity $\eta$ of 2.21 (as measured in THF at 25° C.).

(D) 1000 parts by weight of a polyester diol of adipic acid and a mixture of n-hexane-1,6-diol/neopentyl glycol in a ratio of 65:35 (average molecular weight Mn 2000), 170 parts by weight of diphenyl carbonate, 0.1 part by weight of sodium phenolate and 1.2 parts by weight of Irganox ®PS 800 are treated in the same way as the reaction components in Example (C). On completion of the reaction, a hydroxyl-terminated polyester containing carbonate groups is obtained, having an average molecular weight Mn of 3600 and an intrinsic viscosity $\eta$ of 0.192.

(E) 420.4 parts by weight of the reaction product of Example (A) and 123.2 parts by weight of the reaction product of Example (D) are heated with stirring to 140° C. A vacuum of 0.1 Torr is then applied and the phenol formed is distilled off with stirring and heating to 185° C. A polyether ester containing carbonate groups and having an average molecular weight of 9300 and an intrinsic viscosity $\eta$ of 0.61, measured in the same way as in Example (A), is obtained after a reaction time of 4 hours.

(F) 1000 parts by weight of a polyester diol of adipic acid and a mixture of n-hexane-1,6-diol/neopentyl glycol in a ratio by weight of 65:35 (average molecular weight 2000, as determined by measuring the OH number), 115.1 parts by weight of diphenyl carbonate and 0.1 part by weight of sodium phenolate are stirred for 1 hour under nitrogen at 150° C., after which a vacuum is applied and the temperature is increased to 185° C. The volatile condensation products, above all phenol, distil off and the vacuum may be reduced to 0.4 Torr as the reaction progresses. After a reaction time of 5 hours, the reaction vessel is purged with nitrogen. The product is a pale yellow, rubber-elastic mass having an intrinsic viscosity $\eta$ of 1.07 (as measured in THF at 25° C.).

(G) 500 parts by weight of a polyester diol of adipic acid and a mixture of 1,6-hexane diol and neopentyl glycol in a ratio of 65:35 (average molecular weight Mn. 20,000), 500 parts by weight of a linear polyether of ethylene glycol units (molecular weight 608), 238.6 parts by weight of diphenylcarbonate, 0.1 part by weight of sodium phenolate and 1.2 parts by weight of dilauryl thiodipropionate are covered by a blanket of nitrogen in a reaction vessel, heated with stirring to 180° C., condensed for 1 hour at 180° C. and the volatile condensation products subsequently distilled off in vacuo by increasing the temperature to 190° C. over a period of 1 hour. The product is a solid wax having an intrinsic viscosity $\eta$ of 0.861 (as measured in THF at 25° C.).

(H) 948.5 parts by weight of a linear polyether of ethylene glycol units (average molecular weight 608), 351 parts by weight of diphenylcarbonate and 0.1 part by weight of sodium phenolate are stirred for 1 hour at 160° to 190° C. A vacuum of 1.5 Torr is then applied and the phenol formed is distilled off. After 4 hours distillation, no more volatile condensation products escape. The reaction vessel is then purged with nitrogen and 160 g of a polyester diol of adipic acid and a mixture of 1,6-hexane diol and neopentyl glycol in a ratio of 65:35 (average molecular weight 2000) are added to the mixture. A vacuum is again applied and the phenol is distilled off over a period of 3 hours at 190° C. The product is a very highly viscous oil having an intrinsic viscosity $\eta$ of 0.54 (as measured in THF at 25° C.).

(I) 6716 parts by weight of a polyester diol of adipic acid and a mixture of 1,6-hexane diol and neopentyl glycol in a ratio by weight of 65:35 (average molecular weight Mn 2000), 720 parts by weight of diphenylcarbonate and 0.24 part by weight of sodium phenolate are heated with stirring to 130° C. in a nitrogen-filled stirrerequipped vessel provided with a distillation bridge. The internal pressure of the reactor is then reduced, phenol distilling off. After 1 hour, a pressure of 1 mbar is reached and the temperature is increased. The reaction mixture is then stirred in vacuo for 1 hour at 150° C., for 3.5 hours at 175° C. and then for 2 hours at 180° C. A rubber-like plastic having an intrinsic viscosity $\eta$ of 0.99 dl/g, as measured in THF at 25° C., is obtained.

MOLDING COMPOSITIONS

EXAMPLES 1 to 9

Solutions having the composition indicated in Table I are prepared, the cellulose acetate used being an ester of cellulose with acetic acid which contains 1.55% by weight of hydroxyl groups and which has a viscosity of from 4200 to 4400 mPa.s (20% in acetone/ethanol 9:1).

Films are cast from the solutions and, after evaporation of the solvent, are assessed for transparency (+ = transparent; — = non-transparent).

TABLE I

| Example No. | Parts by weight/ polyester or polyether | Parts by weight of cellulose acetate | Parts by weight of acetone | Parts by weight of tetra- hydro- furan | Trans- parency at 23° C. |
|---|---|---|---|---|---|
| 1 | 30/A | 70 | 400 | | + |
| 1 | 50/A | 50 | 400 | | + |
| 3 | 30/B | 70 | | 400 | + |
| 4 | 50/B | 50 | | 400 | + |
| 5 | 30/E | 70 | 400 | | + |
| 6 | 50/E | 50 | 400 | | + |
| 7 | 10/H | 90 | 400 | | + |

TABLE I-continued

| Example No. | Parts by weight/ polyester or polyether | Parts by weight of cellulose acetate | Parts by weight of acetone | Parts by weight of tetra-hydrofuran | Transparency at 23° C. |
|---|---|---|---|---|---|
| 8 | 40/H | 60 | | 400 | + |
| 9 | 80/H | 20 | | 400 | + |

EXAMPLES 10 to 16

Cellulose acetobutyrate (CAB) containing 37% by weight of butyryl groups, 15% by weight of acetyl groups and 0.8% by weight of hydroxyl groups is mixed in the ratios by weight indicated in Table II with a carbonate-group-containing polyester F in a twin-screw extruder at a barrel temperature of 160° C., followed by granulation.

The granulate is then injection-molded to form test specimens at a melt temperature of 200° C.

TABLE II

| Example No. | CAB | Polyester | Vicat (°C.) | Notched impact strength ak | Transparency (at 23° C.) |
|---|---|---|---|---|---|
| 10 | 95 | 5 | 104 | 5.25 | + |
| 11 | 90 | 10 | 103 | 3.80 | + |
| 12 | 80 | 20 | 83 | 2.21 | + |
| 13 | 50 | 50 | | | + |
| 14 | 35 | 65 | | | + |
| 15 | 10 | 90 | | | + |
| 16 | 0 | 100 | | | + |

The product of Example 16 was opaque after storage for 20 days at 23° C.

The products of Examples 14 and 15 were stored at −20° C. and were still transparent after 40 days.

EXAMPLES 17 to 19

Cellulose acetobutyrate (CAB) containing 37% by weight of butyryl groups, 15% by weight of acetyl groups and 0.8% by weight of hydroxyl groups is mixed in the form of a solution with a solution of the carbonate-group-containing polyester C in the ratios by weight indicated in Table III. Films were cast from the solutions according to Table III and assessed for transparency.

EXAMPLES 20 to 22

Solutions having the composition indicated in Table III are prepared using a cellulose propionate containing from 49 to 49.5% by weight of propionyl groups and 1.6% by weight of hydroxyl groups and having a viscosity of 3000 mPa.s (20% in acetone/ethanol 9:1).

Films are cast from the solutions and, after evaporation of the solvent, are assessed for transparency.

TABLE III

| Example No. | Parts by weight/ polyester | Parts by weight of CAB | Parts by weight of CB | Parts by weight of tetra-hydrofuran | Transparency |
|---|---|---|---|---|---|
| 17 | 20/C | | 80 | 400 | + |
| 18 | 50/C | | 50 | 400 | + |
| 19 | 70/C | | 30 | 400 | + |
| 20 | 20/G | 80 | | 400 | + |
| 21 | 50/G | 50 | | 400 | + |
| 22 | 70/G | 30 | | 400 | + |

EXAMPLES 23 to 25

Cellulose acetobutyrate containing 42 to 46% of butyric acid, 18 to 21% of acetic acid and 0.7 to 1.7% of hydroxyl groups (CAB) is mixed on rolls at 160° C. with the carbonate-group-containing polyester I, as shown in Table IV.

The rough sheets are granulated and the granulates subsequently injection-molded to form test specimens at a melt temperature of 220° C.

EXAMPLES 26 to 28

Cellulose propionate containing 49 to 49.5% by weight of propionyl groups and 1.6% by weight of hydroxyl groups (CP) is mixed on rolls for 8 minutes at 160° C. with the carbonate-group-containing polyester I, as indicated in Table IV.

The rough sheets are granulated and subsequently injection-molded to form test specimens at a melt temperature of 230° C.

TABLE IV

| Example No. | % by weight cellulose ester | % by weight of polyester carbonate | MFI (2.16 kp) g/10 mins. 210° C. | MFI (2.16 kp) g/10 mins. 230° C. | Vicat (°C.) | Notched impact strength $a_n$ (kJ/m²) 23° C. | 0° C. | −10° C. | −20° C. | −40° C. |
|---|---|---|---|---|---|---|---|---|---|---|
| 23 | 97.5 CAB | 2.5 | 1.93 | 7.85 | 94 | 96.6 | 102.6 | 103.2 | 100.7 | 83.0 |
| 24 | 95 CAB | 5.0 | 2.61 | 8.24 | 86 | 106.8 | 111.6 | 105.8 | 91.6 | 92.0 |
| 25 | 90 CAB | 10.0 | 4.17 | 15.42 | 69 | — | 68.2 | 66.9 | 55.6 | 40.3 |
| | 100 CAB | 0 | | | 96 | | 83 | | | 80 |
| 26 | 97.5 CP | 2.5 | 0.82 | 4.88 | 105 | 102.1 | 104.5 | 95.8 | 118.5 | 114.5 |
| 27 | 95 CP | 5.0 | 1.18 | 5.23 | 95 | 73.6 | 103.7 | 131.6 | 97.4 | 94.6 |
| 28 | 90 CP | 10.0 | 2.16 | 8.03 | 80 | — | 129.5 | 128.7 | 120.4 | 106.6 |
| | 100 CP | 0 | | | 55 | | 41–94 | | | 51–71 |

In the Tables, $a_k$ represents impact strength according to DIN 53453 (dimension kJ/m²), $a_n$ represents notched impact strength according to DIN 53453 (dimension kJ/m²) and Vicat represents the Vicat softening temperature, method B) (force: 49.05 N), according to DIN 53460 (dimension [° C.]).

We claim:

1. A thermoplastic moulding composition consisting of
   I. from 1 to 99% by weight of at least one cellulose ester or cellulose mixed ester; and
   II. from 99 to 1% by weight of an aliphatic polyester or polyether containing carbonate groups in the polymer chain as linkage and optionally standard auxiliaries and additives.

2. A thermoplastic moulding composition as claimed in Claim 1, wherein component II is a compound of the following recurring structural unit I

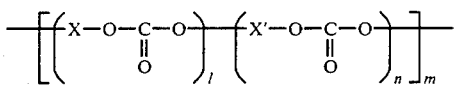

in which
X' are the same or different residues of a polyester having a molecular weight of from 200 to 6000
X'=X or are the same or different residues of aliphatic polyethers having a molecular weight of from 200 to 20000, l is an integer of from 1 to 20
n=0 or is an integer of from 1 to 20 and
m is an integer of $\geq 20$,
and in that the compounds have an intrinsic viscosity $\eta$ in tetrahydrofuran of from 0.5 to 2.5 dl/g at 25° C.

3. A thermoplastic moulding composition as claimed in claim 1 consisting of from 80 to 97 % by weight of component I from 3 to 20% by weight of component II.

4. A moulding composition as claimed in claim 3 consisting of from 85 to 95% by weight of component I and from 5 to 15% by weight of component II.

5. A moulding composition as claimed in claim 1 consisting of from 1 to 50% by weight of component I and from 50 to 99 % by weight of component II.

6. A moulding composition as claimed in claim 5 consisting of from 10 to 35% by weight of component I and from 90 to 65 % by weight of component II.

7. A moulding composition as claimed in claim 2 wherein in the general formula I the residue X' has a molecular weight of from 1000 to 2500 and the residue X has a molecular weight of from 200 to 1000.